US011716134B2

(12) United States Patent
Zhang et al.

(10) Patent No.: US 11,716,134 B2
(45) Date of Patent: Aug. 1, 2023

(54) PHASE NOISE SUPPRESSION METHOD FOR A MULTIPLE-INPUT MULTIPLE-OUTPUT (MIMO) SYSTEM WITH A PLURALITY OF CO-REFERENCE CHANNELS

(71) Applicant: ZHEJIANG LAB, Hangzhou (CN)

(72) Inventors: Changming Zhang, Hangzhou (CN); Xianbin Yu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/075,466

(22) Filed: Dec. 6, 2022

(65) Prior Publication Data

US 2023/0102046 A1 Mar. 30, 2023

Related U.S. Application Data

(63) Continuation of application No. PCT/CN2022/079270, filed on Mar. 4, 2022.

(30) Foreign Application Priority Data

May 25, 2021 (CN) .......................... 202110571337.8

(51) Int. Cl.
*H04B 7/0413* (2017.01)
*H04B 7/08* (2006.01)
*H04B 1/12* (2006.01)

(52) U.S. Cl.
CPC ........... *H04B 7/0851* (2013.01); *H04B 1/126* (2013.01); *H04B 7/0413* (2013.01); *H04B 7/0854* (2013.01)

(58) Field of Classification Search
CPC .. H04B 7/0857; H04B 7/0854; H04B 7/0413; H04B 1/126
See application file for complete search history.

(56) References Cited

U.S. PATENT DOCUMENTS 9,537,683 B1 1/2017 Zamani et al.
2014/0133479 A1 5/2014 Brown et al.
(Continued)

FOREIGN PATENT DOCUMENTS

CN 102539944 A 7/2012
CN 103378921 A 10/2013
(Continued)

OTHER PUBLICATIONS

Peng Cong, et al., Analysis and mitigation of common phase error of phase noises in MIMO-OFDM systems, Journal of Terahertz Science and Electronic Information Technology, 2018, pp. 813-820, vol. 16, No. 5.
(Continued)

*Primary Examiner* — Rahel Guarino
(74) *Attorney, Agent, or Firm* — Bayramoglu Law Offices LLC (57) ABSTRACT

A phase noise suppression method for a multiple-input multiple-output (MIMO) system with a plurality of co-reference channels includes: dividing the phase noise of each channel in the MIMO system into common phase noise and independent phase noise, and constructing a certain number of joint phase states for the independent phase noise; inserting a pilot sequence into the sent signal based on a preset cycle, obtaining the common phase noise based on the pilot at receiver, and performing compensation; and performing signal demodulation on each joint state of the independent phase noise, and comparing the posterior log likelihood values to select the optimal result to output. The above method can significantly improve the phase noise suppression performance of the MIMO system with a plurality of co-reference channels, thereby providing support for improving the system capacity by using MIMO technology.

3 Claims, 4 Drawing Sheets

(56) References Cited

U.S. PATENT DOCUMENTS

| | | |
|---|---|---|
| 2018/0123652 A1* | 5/2018 | Ko .................... H04L 1/0054 |
| 2018/0167237 A1 | 6/2018 | Gudovskiy et al. |
| 2019/0109747 A1 | 4/2019 | Hessler et al. |
| 2019/0245718 A1 | 8/2019 | Jana et al. |
| 2019/0319631 A1 | 10/2019 | Buliga |

FOREIGN PATENT DOCUMENTS

| | | |
|---|---|---|
| CN | 104871465 A | 8/2015 |
| CN | 106767940 A | 5/2017 |
| CN | 107306141 A | 10/2017 |
| CN | 108965174 A | 12/2018 |
| CN | 109075937 A | 12/2018 |
| CN | 109361436 A | 2/2019 |
| CN | 110166401 A | 8/2019 |
| CN | 110336762 A | 10/2019 |
| CN | 111384982 A | 7/2020 |
| CN | 111492595 A | 8/2020 |
| CN | 112312535 A | 2/2021 |
| CN | 112583753 A | 3/2021 |
| CN | 112653497 A | 4/2021 |
| CN | 113315561 A | 8/2021 |
| JP | 2017520974 A | 7/2017 |
| WO | 2016148158 A1 | 9/2016 |
| WO | 2018120839 A1 | 7/2018 |
| WO | 2020217941 A1 | 10/2020 |

OTHER PUBLICATIONS

Shi Jia, et al., 120 Gbit/s Multi-channel THz Wireless Transmission and THz Receiver Performance Analysis, IEEE photonic Technology Letters, 2017, pp. 1-4.

Li Yanlin, Research on OFDM-related technologies based on cognitive radio, Master Thesis Beijing University of Posts and Telecommunications, 2011, pp. 1-62.

Xuanyu Zheng, et al., Joint Channel and Location Estimation of Massive MIMO System with Phase Noise, IEEE Transactions on Signal Processing, 2020, pp. 1-14.

Shen Min, et al., Influence of 5G millimeter wave hardware impairments on waveforms and compensation methods, Journal of Chongqing University of Posts and Telecommunications (Natural Science Edition), 2020, pp. 544-553, vol. 32, No. 4.

Changming Zhang, et al., Iterative Channel Estimation and Phase Noise Compensation for SC-FDE based mmWave Systems, IEEE ICC 2015—Workshop on Advanced PHY and MAC Techniques for Super Dense Wireless Networks, 2015, pp. 2133-2138.

* cited by examiner

PHASE NOISE SUPPRESSION METHOD FOR A MULTIPLE-INPUT MULTIPLE-OUTPUT (MIMO) SYSTEM WITH A PLURALITY OF CO-REFERENCE CHANNELS

CROSS REFERENCE TO THE RELATED APPLICATIONS

This application is the continuation application of International Application No. PCT/CN2022/079270, filed on Mar. 4, 2022, which is based upon and claims priority to Chinese Patent Application No. 202110571337.8, filed on May 25, 2021, the entire contents of which are incorporated herein by reference.

TECHNICAL FIELD

The present disclosure relates to the field of wireless communication and signal processing, and more specifically to a phase noise suppression method for a multiple-input multiple-output (MIMO) system with a plurality of co-reference channels.

BACKGROUND

MEMO technology realizes parallel transmission for a plurality of data links through spatial multiplexing by configuring a plurality of antennas at transmitter and receiver of a communication system, thereby multiplying the capacity of the system. As one of core technologies of the fifth/sixth generation mobile communication system (5G/6G), the MIMO technology has received a lot of attention and practical applications in many fields such as wireless access networks and wireless bearer networks. However, as communication frequencies gradually move towards millimeter wave, terahertz and other high-frequency bands, phase noise caused by non-ideal characteristics of a local oscillator in up-conversion and down-conversion processes is very significant, which greatly reduces the performance of MIMO system. Therefore, it is necessary to design a method to suppress the phase noise, to give play to a theoretical advantage of the MEM technology on improving system capacity.

At present, for phase noise suppression of MIMO system, a case in which independent local oscillators are used for each channel and a case in which a local oscillator is shared among channels are mainly considered. For the case in which independent local oscillators are used for each channel, phase noise of different channels at transmitter is not correlated with each other, and phase noise of different channels at receiver is not correlated with each other. In existing methods, impact of the phase noise is regarded as a real-time phase change of channel response coefficient. A pilot is inserted periodically, a channel response is estimated based on the pilot, and phase noise at the pilot is obtained based on the phase change of the channel response coefficient. Then, phase noise of effective data is obtained through interpolation fitting. Finally, phase noise of a plurality of channels is suppressed in the signal demodulation process. However, this method extends the degree of freedom of the phase noise. Considering that a number of antennas at transmitter and a number of antennas at receiver are $N_t$ and $N_r$, respectively, the degree of freedom of the phase noise is $N_t+N_r$, but becomes $N_tN_r$ according to the above method, which makes it difficult to ensure good phase noise estimation and suppression performance. In addition, this method needs to perform channel estimation periodically, resulting in a large pilot overhead and significant impact on the throughput of effective data. For the case in which a local oscillator is shared among channels, the phase noise of different channels at transmitter is identical, the phase noise of different channels at receiver is identical, and phase noise suppression can be performed by using a method like those adopted in a single input single output (SISO) system. For the structure skating the local oscillator, power allocation needs to be performed on a local oscillator signal. However, for high-frequency band communication, power allocation is characterized by a complicated implementation structure, a large loss, and a high cost.

Considering the performance and the cost, a relatively cost-effective method for generating the local oscillator signal in the MIMO system is to generate, by the frequency multipliers, the corresponding local oscillator signal for each channel, where the input of these frequency multipliers is a common low-frequency reference signal. In this case, it is only necessary to perform power allocation on the low-frequency reference signal, where the related technology is relatively mature, and the performance and the cost can be better guaranteed than power allocation on high-frequency oscillator. In the co-reference architecture, phase noise of each channel in the MIMO system can be divided into two parts: common phase noise from the reference signal and independent phase noise additionally generated in the frequency multiplication process of each channel. In existing technical solutions, there is no phase noise suppression method for MIMO system in the above co-reference condition. Although the traditional methods for the case in which independent local oscillators are used for each channel and the case in which a local oscillator is shared among channels can achieve a certain suppression capability, the performance is poor. In view of the above problems, the present disclosure designs a phase noise suppression method for the MIMO system with a plurality of co-reference channels to improve the communication performance and further give full play to a theoretical advantage of improving the transmission capacity through spatial multiplexing.

SUMMARY

The present disclosure is intended to provide a phase noise suppression method for an MEMO system with a plurality of co-reference channels, to improve phase noise suppression performance of the MIMO system with a plurality of co-reference channels and provide support for improving the system transmission capacity.

To achieve the above objective, the present disclosure adopts the following technical solutions:

S11: dividing phase noise of each co-reference channel in the MIMO system into common phase noise and independent phase noise, constructing a certain number of joint phase states for the independent phase noise, and calculating a log likelihood value and a multi-channel decorrelation coefficient matrix that correspond to each joint phase state;

S12: inserting a pilot sequence into a sent signal based on a preset cycle, estimating the common phase noise based on the pilot at receiver, Obtaining the common phase noise at the effective data other than the pilot through interpolation fitting, and performing compensation; and S13: for each joint phase state of the independent phase noise, based on the multi-channel decorrelation coefficient matrix, performing signal demodulation on a result obtained after compensating for the common phase noise in S12, and calculating a posterior log likelihood value; and taking the joint phase state with the maximum posterior log likelihood value as an estimation result of the independent phase noise of the plurality of channels, and taking the corresponding demodulation result as the final output.

Compared with the prior art, the present disclosure has the following advantages:

The present disclosure divides the phase noise of each channel in the MIMO system into the common phase noise and the independent phase noise for processing. After loop filtering with a low-pass characteristic in a phase-locked loop, the common phase noise is mainly distributed in a low-frequency region, in other words, the common phase noise between adjacent symbols in the time domain is strongly correlated. After the common phase noise at the pilot is estimated by periodically inserting the pilot, the common phase noise of the effective data can be obtained through interpolation fitting, and then corresponding compensation is performed. Different from the common phase noise, the independent phase noise of each channel is mainly distributed in a high-frequency region, and fast changes. Independent phase noise between adjacent symbols are poorly correlated, which are like white Gaussian noise, and cannot be accurately estimated through conventional interpolation fitting or by using a prediction algorithm.

The present disclosure quantizes each element of the independent phase noise, that is, it is considered that each element is only distributed on a few phase states. A number of quantized states of each element may be the same or different, depending on a respective variance of each element, and the joint state of the independent phase noise of the plurality of channels, the log likelihood value, and the multi-channel decorrelation coefficient matrix are independent of the symbol sequence number k and can be calculated offline. Under a tradeoff between performance and complexity, a number of quantized states of each element of the independent phase noise can be selected to establish the certain number of joint states, and a signal demodulation result corresponding to each joint state is compared to select the optimal result to output.

Compared with an existing method for a case in which independent local oscillators are used or a case in which a local oscillator is shared, the present disclosure is more suitable for the co-reference architecture in an actual situation and can ensure a better phase noise suppression performance. Experimental results also verify that the solutions in the present disclosure can fully mine internal characteristics of the co-reference architecture, significantly improve the bit error rate (BER) performance, and typically reduce the error floor by more than 10 times, thereby providing support for improving the transmission capacity through spatial multiplexing.

DETAILED DESCRIPTION OF THE EMBODIMENTS

The present disclosure is further described below with reference to the accompanying drawings and embodiments.

Figure 1:
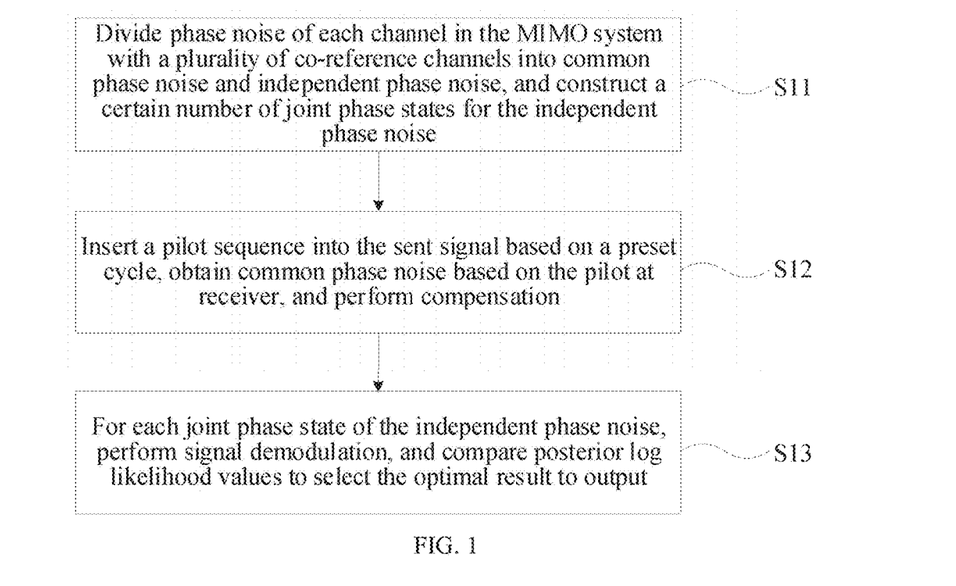
FIG. 1 is a flowchart of a phase noise suppression method for an MIMO system with a plurality of co-reference channels according to the present disclosure.

The present disclosure provides a phase noise suppression method for an MIMO system with a plurality of co-reference channels. As shown in FIG. 1, the method includes: dividing phase noise of each channel in the MIMO system into common phase noise and independent phase noise, and constructing a certain number of joint phase states for the independent phase noise; inserting a pilot sequence into the sent signal based on a preset cycle, obtaining the common phase noise based on the pilot at receiver, and performing compensation; and performing signal demodulation on each joint state of the independent phase noise, and comparing posterior log likelihood values to select the optimal result to output. The above method can significantly improve phase noise suppression performance of the MIMO system with the plurality of co-reference channels, thereby providing support for improving the system capacity by using MIMO technology.

Figure 2:
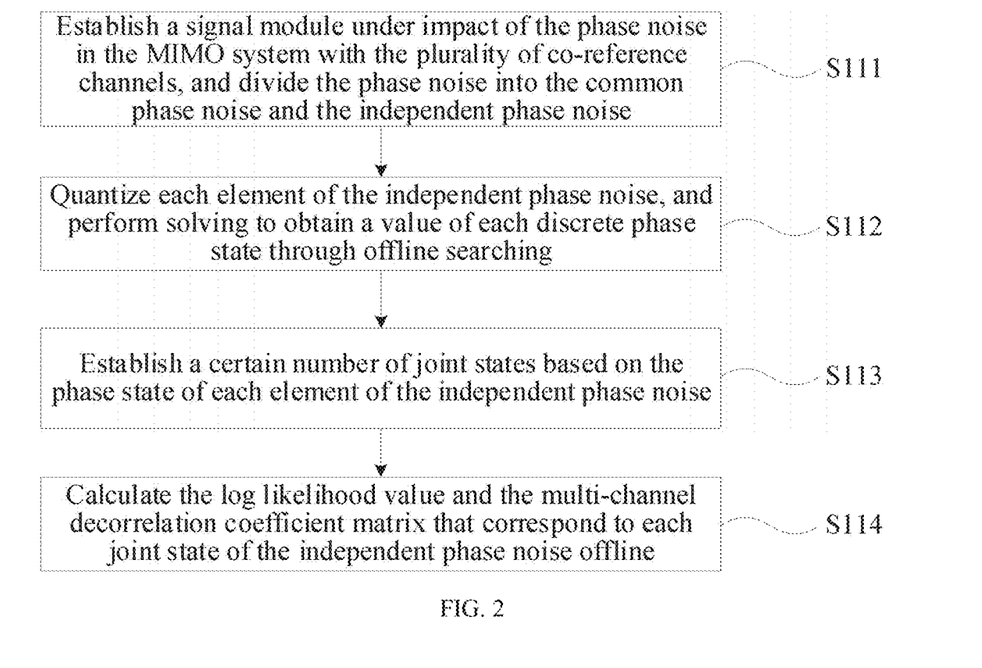
FIG. 2 is a flowchart of step 1 according to the present disclosure.

A specific implementation process includes the following steps:

Step 1: Phase noise of each channel in the MIMO system with a plurality of co-reference channels is divided into common phase noise and independent phase noise, a certain number of joint phase states is constructed for the independent phase noise, and a log likelihood value and a multi-channel decorrelation coefficient matrix that correspond to each joint phase state are calculated, as shown in FIG. 2.

Figure 3:
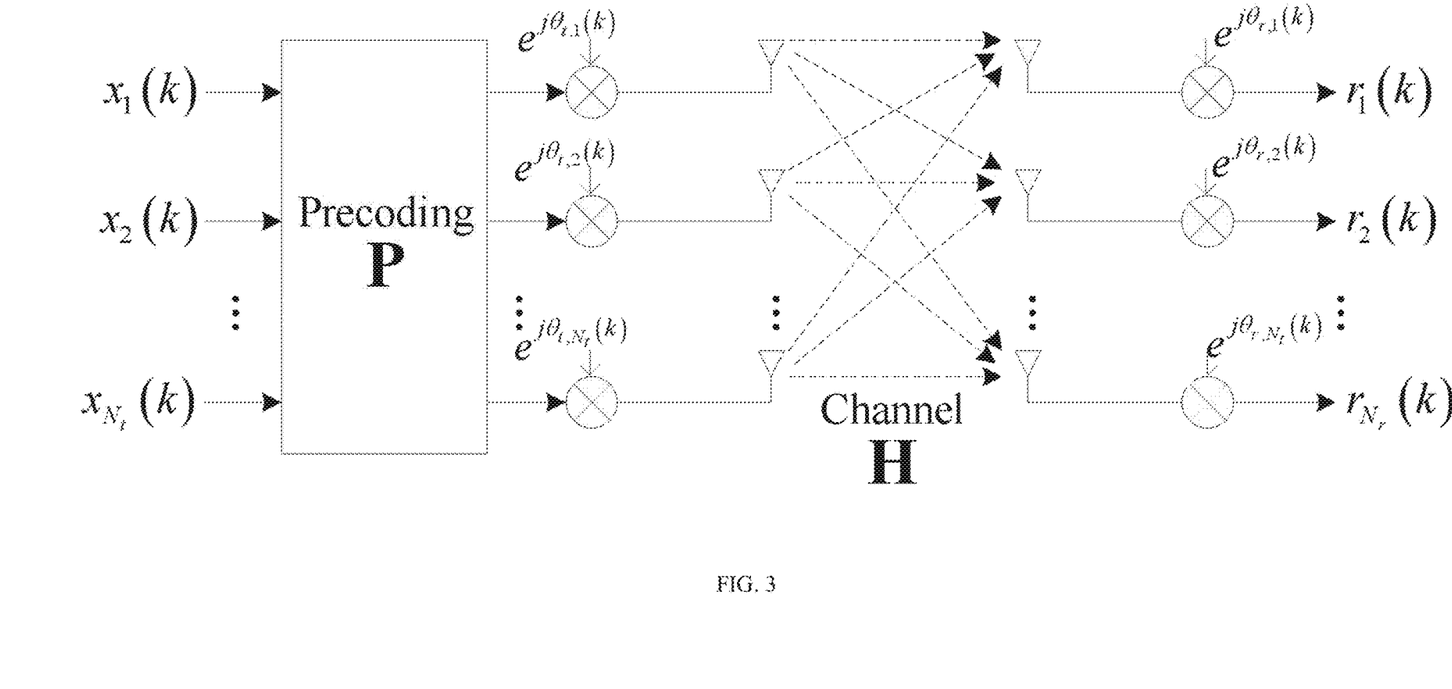
FIG. 3 is a schematic diagram of a system model under impact of phase noise in the MIMO system with a plurality of co-reference channels.

FIG. 3 shows the system model under impact of the phase noise in the MIMO system with the plurality of co-reference channels. Considering that the number of antennas at transmitter and the number of antennas at receiver are $N_t$ and $N_r$ respectively, it may be assumed that the number of signal streams is equal to $N_t$ and $N_t \leq N_r$, and the received signal under the impact of phase noise of the plurality of channels is expressed as formula (1):

$$r(k) = \Theta_r(k) H \Theta_t(k) P x(k) + n(k) \quad (1)$$

Herein, $x(k) = [x_1(k)\ x_2(k)\ L\ x_{N_t}(k)]^T$ represents a sent signal of each channel at time point k, and the superscript T represents that transposition is performed; P represents an $N_t \times N_t$ precoding matrix, satisfying $P^H P = I_{N_t \times N_t}$, where the superscript H represents that conjugate transposition is performed, and $I_{N_t \times N_t}$ represents an $N_t \times N_t$ identity matrix;

$$\Theta_t(k) = \text{diag}\{[\ e^{j\theta_{t,1}(k)}\ e^{j\theta_{t,2}(k)}\ L\ e^{j\theta_{t,N_t}(k)}\ ]^T\}$$

represents a diagonal matrix formed by $e^{j\Theta_{t,i}(k)}$, namely, the exponent of phase noise at transmitter of each channel at time point k; H represents an $N_r \times N_t$ channel response matrix, where the element in the $i^{th}$ row and the $j^{th}$ column, namely, $h_{i,j}$, represents the channel gain from the $j^{th}$ transmitting antenna to the $i^{th}$ receiving antenna;

$$\Theta_r(k) = \text{diag}\{[\ e^{j\theta_{r,1}(k)}\ e^{j\theta_{r,2}(k)}\ L\ e^{j\theta_{r,N_r}(k)}\ ]^T\}$$

represents a diagonal matrix formed by $e^{j\Theta_r(k)}$, namely, the exponent of phase noise at receiver of each channel at time point k; and $$r(k) = \begin{bmatrix} r_1(k) & r_2(k) & L & r_{N_r}(k) \end{bmatrix}^T \text{ and } n(k) = \begin{bmatrix} n_1(k) & n_2(k) & L & n_{N_r}(k) \end{bmatrix}^T$$

represent a received signal and additive white Gaussian noise of each channel at time point k respectively.

In the case of co-reference, phase noise of each channel at transmitter and receiver includes common phase noise and independent phase noise, where the common phase noise is from a reference signal, and the independent phase noise is additionally generated in the frequency multiplication process. In other words, the phase noise of each channel at transmitter and the phase noise of each channel at receiver can be expressed as $\theta_{t,j}(k)=\theta_t(k)+\Delta\theta_{t,k}(k)$ ($1\leq j\leq N_t$) and $\theta_{r,i}(k)=\theta_r(k)+\Delta\theta_{r,i}(k)$ ($1\leq i\leq N_r$) respectively, where $\theta_{t,j}(k)$ and $\theta_{r,i}(k)$ represent phase noise of the $j^{th}$ channel at transmitter and phase noise of the $i^{th}$ channel at receiver at time point k respectively, $\theta_t(k)$ and $\theta_r(k)$ represent the common phase noise of each channel at transmitter and the common phase noise of each channel at receiver at time point k respectively, and $\Delta\theta_{t,j}(k)$ and $\Delta\theta_{r,i}(k)$ represent the independent phase noise of the $j^{th}$ channel at transmitter and the independent phase noise of the $i^{th}$ channel at receiver at time point k respectively. Therefore, formula (1) can be further expressed as formula (2):

$$r(k)=e^{j\Theta(k)}[\Delta\Theta_r(k)H\Delta\Theta_t(k)Px(k)]+n(k) \quad (2)$$

In the above formula, $\theta(k)=\theta_t(k)+\theta_r(k)$ represents the sum of the common phase noise at transmitter and the common phase noise at receiver at time point k. After loop filtering with a low-pass characteristic in a phase-locked loop, the common phase noise is mainly distributed in a low-frequency region, in other words, the common phase noise between adjacent symbols in the time domain is strongly correlated, After the common phase noise at pilot is estimated by periodically inserting the pilot, the common phase noise of effective data can be obtained through interpolation fitting, and then corresponding compensation can be performed.

$$\Delta\Theta_t(k) = \text{diag}\left\{ \begin{bmatrix} e^{j\Delta\theta_{t,1}(k)} & e^{j\Delta\theta_{t,2}(k)} & L & e^{j\Delta\theta_{t,N_t}(k)} \end{bmatrix}^T \right\}$$

represents a diagonal matrix formed by $e^{j\Delta\Theta_{t,j}(k)}$, namely, the exponent of the independent phase noise of each channel of the transmitting antenna at time point k; and $$\Delta\Theta_r(k) = \text{diag}\left\{ \begin{bmatrix} e^{j\Delta\theta_{r,1}(k)} & e^{j\Delta\theta_{r,2}(k)} & L & e^{j\Delta\theta_{r,N_r}(k)} \end{bmatrix}^T \right\}$$

represents a diagonal matrix formed by $e^{j\Delta\Theta_{r,j}(k)}$, namely, the exponent of the independent phase noise of each channel of the receiving antenna at time point k. Different from the common phase noise, the independent phase noise of each channel is mainly distributed in a high-frequency region, and fast changes. Independent phase noise between adjacent symbols are poorly correlated, which are like white Gaussian noise and cannot be accurately estimated through conventional interpolation fitting or by using a prediction algorithm.

The following formula is obtained:

$$\Delta\theta(k) = [\Delta\theta_{t,1}(k) \quad \Delta\theta_{t,2}(k) \quad L \quad \Delta\theta_{t,N_t}(k) \quad \Delta\theta_{r,1}(k) \quad \Delta\theta_{r,2}(k) \quad L \quad \Delta\theta_{r,N_r}(k)]^T$$

$$= [\Delta\theta_1(k) \quad \Delta\theta_2(k) \quad L \quad \Delta\theta_{N_t+N_r}(k)]^T$$

The present disclosure quantizes each element of the independent phase noise, in other words, it is considered that each element is distributed only in a few phase states. It is assumed that the distribution function of the $m^{th}$ element $\Delta\theta_m(k)$ ($1\leq m\leq N_t+N_r$) in $\Delta\theta(k)$ is $f_m(x)$, and $\Delta\theta_m(k)$ is quantized into $Z_m$ phase states, which are denoted as $$\varphi_m = \begin{bmatrix} \varphi_{m,1} & \varphi_{m,2} & L & \varphi_{m,Z_m} \end{bmatrix}^T,$$

where $\varphi_{m,1}<\varphi_{m,2}<L<\varphi_{m,Z_m}$. A quantization criterion is as follows:

$$\min_{\varphi_m} \int_{-\infty}^{+\infty} \min_{z(1\leq z\leq Z_m)} (x-\varphi_{m,z})^2 f_m(x)dx \quad (3)$$

$$= \min_{\varphi_m} \sum_{z=1}^{Z_m} \int_{\frac{\varphi_{m,z-1}+\varphi_{m,z}}{2}}^{\frac{\varphi_{m,z}+\varphi_{m,z+1}}{2}} (x-\varphi_{m,z})^2 f_m(x)dx$$

In the above formula, $\varphi_{m,0}=-\infty$, $\varphi_{m,Z_m+1}=+\infty$. The independent phase noise is like the white Gaussian noise. A distribution interval of the white Gaussian noise is $(-\infty, +\infty)$, and the periodic phase element should be distributed between $-\pi$ and $\pi$. However, the independent phase noise is small and only fluctuates around zero. Therefore, the integral region between $-\infty$ and $+\infty$ is also equivalent to that between $-\pi$ and $\pi$. The minimization objective in formula (3) is a piecewise integral function. To satisfy the minimization, each discrete phase state $\varphi_{m,z}$ ($1\leq z\leq Z_m$) needs to be equal to the mean value of the corresponding integral segment. It may be assumed that $\Delta\theta_m(k)$ follows the zero-mean Gaussian distribution with a variance being $\sigma_m^2$. In this case, each discrete phase state can be obtained according to the following formula:

$$\varphi_{m,z} = \frac{\int_{\frac{\varphi_{m,z-1}+\varphi_{m,z}}{2}}^{\frac{\varphi_{m,z}+\varphi_{m,z+1}}{2}} x f_m(x)dx}{\int_{\frac{\varphi_{m,z-1}+\varphi_{m,z}}{2}}^{\frac{\varphi_{m,z}+\varphi_{m,z+1}}{2}} f_m(x)dx} = \quad (4)$$

$$\sqrt{\frac{2}{\pi}} \sigma_m \frac{\exp\left\{-\frac{(\varphi_{m,z-1}+\varphi_{m,z})^2}{8\sigma_m^2}\right\} - \exp\left\{-\frac{(\varphi_{m,z}+\varphi_{m,z+1})^2}{8\sigma_m^2}\right\}}{\text{erf}\left(\frac{\varphi_{m,z}+\varphi_{m,z+1}}{2\sqrt{2}\sigma_m}\right) - \text{erf}\left(\frac{\varphi_{m,z-1}+\varphi_{m,z}}{2\sqrt{2}\sigma_m}\right)}$$

In the above formula, $$\mathrm{erf}(x) = \frac{2}{\sqrt{\pi}} \int_0^x e^{-\eta^2} d\eta,$$

and $\exp(x)=e^x$. Formula (4) provides a method for solving based on $\varphi_{m,Z+1}$ based on $\varphi_{m,Z-1}$ and $\varphi_{m,Z}$. Therefore, when a given variance $\sigma_m^2$ is provided, the value of each discrete phase state $\varphi_{m,z}$ ($1 \leq z \leq Z_m$) accurately calculated offline by searching $\varphi_{m,1}$. Table 1 gives the values of $\varphi_{m,z}/\sigma_m$ that correspond to different numbers of phase states.

TABLE 1

Discrete values corresponding to different numbers of phase states

| $Z_m$ | $\varphi_{m,z}/\sigma_m$ ($1 \leq z \leq Z_m$) |
|---|---|
| 2 | −0.798, 0.798 |
| 3 | −1.224, 0, 1.224 |
| 4 | −1.510, −0.453, 0.453, 1.510 |
| 5 | −1.724, −0.765, 0, 0.765, 1.724 |
| 6 | −1.894, −1.000, −0.318, 0.318, 1.000, 1.894 |
| 7 | −2.033, −1.188, −0.561, 0, 0.561, 1.188, 2.033 |
| 8 | −2.152, −1.344, −0.756, −0.245, 0.245, 0.756, 1.344, 2.152 |

After all $N_t+N_r$ elements of the independent phase noise are quantized, a state is selected from each element to construct a joint state. The total number of joint states is $$Z = \sum_{m=1}^{N_t+N_r} Z_m.$$

Herein, the number $Z_m$ of quantized states of each element may be the same or different, depending on the valiance of each element.

For convenience of description, the element of the $z^{th}$ selection from the phase state vector $\varphi_m$, corresponding to the element $\Delta\theta_m(k)$ is denoted as $\psi_{z,m}$ (where $\psi_{z,m}$ is an element in $\varphi_m$ ($1 \leq m \leq N_t+N_r$)) to construct the $z^{th}$ joint state, which is denoted as $$\psi_z = [\psi_{z,1} \ \psi_{z,2} \ L \ \psi_{z,N_t+N_r}]^T.$$

A boa likelihood value corresponding to the joint state $\psi_z$ is expressed as follows:

$$\lambda_z = \log f(\psi_z) = \sum_{m=1}^{N_t+N_r} \log f(\psi_{z,m}) = -\sum_{m=1}^{N_t+N_r} \frac{\psi_{z,m}^2}{2\sigma_m^2} + \upsilon \quad (5)$$

in the above formula, $\upsilon$ represents a common coefficient that can be ignored, and $f(.)$ represents a likelihood function.

When the common phase noise is corrected, according to formula (2), a multi-channel decorrelation coefficient matrix corresponding to the joint state $\psi_z$ of the independent phase noise can be obtained based on the minimum mean square error (MMSE) algorithm, namely $$W_z = \left(\tilde{H}_z^H \tilde{H}_z + \sigma_n^2 I_{N_t \times N_t}\right)^{-1} \tilde{H}_z^H \quad (6)$$

In the above formula, $$\tilde{H}_z = \mathrm{diag}\left\{\left[e^{j\psi_{z,N_t+1}} \ e^{j\psi_{z,N_t+2}} \ \ldots \ e^{j\psi_{z,N_t+N_r}}\right]^T\right\}$$
$$H \, \mathrm{diag}\left\{\left[e^{j\psi_{z,1}} \ e^{j\psi_{z,2}} \ \ldots \ e^{j\psi_{z,N_t}}\right]^T\right\} P$$

represents an equivalent response matrix corresponding to $\psi_z$, and $\sigma_n^2$ represents power of the additive white Gaussian noise.

In the present disclosure, the joint state $\psi_z$ of the independent phase noise of the plurality of channels, the log likelihood value $\lambda_z$, and the multi-channel decorrelation coefficient matrix $$W_z\left(1 \leq z \leq Z = \prod_{m=1}^{N_t+N_r} Z_m\right)$$

are independent of the symbol sequence number k and can be calculated offline. A key to determine the complexity is the selected number of quantized states $Z_m$ on each element of independent phase noise. A larger value of $Z_m$ corresponds to a smaller quantization error, namely, a smaller suppression error of the independent phase noise, but results in a larger number of joint states Z, namely, higher complexity. Therefore, it is necessary to select the number of quantized states $Z_m$ on each element of the independent phase noise under a tradeoff between performance and complexity.

Figure 4:
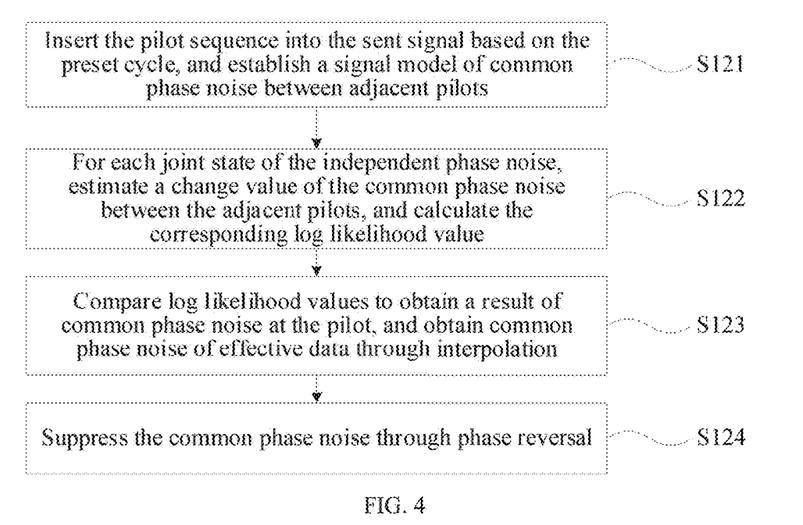
FIG. 4 is a flowchart of step 2 according to the present disclosure.

Step 2: A pilot sequence is inserted into the sent signal based on a preset cycle, the common phase noise at the pilot is estimated at receiver, the common phase noise of the effective data is obtained through interpolation fitting, and suppression is performed, as shown in FIG. 4.

Figure 5:
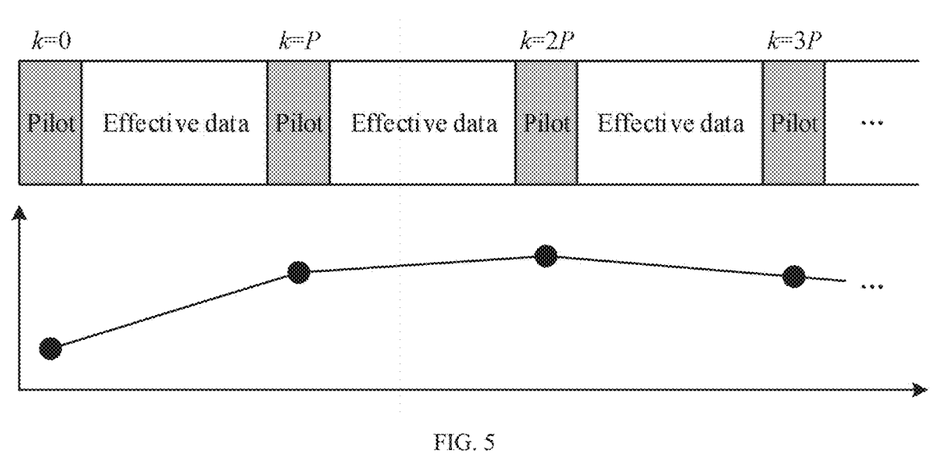
FIG. 5 is a schematic diagram of an implementation of obtaining common phase noise through pilot insertion and interpolating fitting according to the present disclosure.

During suppression of the phase noise of the plurality of channels, the common phase noise needs to be suppressed first. In the present disclosure, the common phase noise at the pilot is estimated based on the pilot, then the common phase noise of the effective data is obtained through interpolation, and then compensation is performed, as shown in FIG. 5. The pilot density is 1/P, that is, the pilot is corresponded when $k=\alpha P$ ($\alpha$ is an integer), and the effective data is corresponded at other time points. The change of the common phase noise at the pilot can be regarded as a Wiener process, as shown in the following formula (7), where $\Delta\theta(\alpha P)$ represents a change value of the common phase noise at the position $\alpha P+P$ relative to the position $\alpha P$, which follows the zero-mean Gaussian distribution, and its variance is denoted as a $\sigma_p^2$. An estimation process of the common phase noise can be equivalent to an estimation process of the change value $\Delta\theta(\alpha P)$.

$$\theta(\alpha P+P)=\theta(\alpha P)+\Delta\theta(\alpha P)$$

Assuming that an estimated value of the common phase noise at the position aP is $\hat{\theta}(aP)$, by denoting $\tilde{H}(k)=\Delta\Theta_r(k) H\Delta\Theta_t(k)P$, the received symbol of the pilot at the position $aP+P$ is $r(aP+P)=e^{j[\hat{\theta}(aP)+\Delta\theta(aP)]}\tilde{H}(aP+P)x(aP+P)+n(aP+P)$, where $x(aP+P)$ is known symbol and $\tilde{H}(aP+P)$ is unknown. However, corresponding $\Delta\theta(aP)$ can be estimated and solved for each joint state constructed by the independent phase noise. A result shown in the following formula (8) can be obtained based on the least square (LS) algorithm, where the operator z represents that the phase is taken from a complex data.

$$\Delta\tilde{\theta}_z(aP) = -\angle\left[e^{j\hat{\theta}(aP)}r^H(aP+P)\tilde{H}_z x(aP+P)\right], (1 \le z \le Z) \quad (8)$$

In the above formula, $\Delta\tilde{\theta}_z(aP)$ represents an initial estimated value of the change value of the $z^{th}$ piece of common phase noise at the pilot position aP+P relative to the position aP. After initial estimated values of change values of z pieces of common phase noise are obtained in total, the optimal estimation result needs to be selected through comparison. The present disclosure obtains log likelihood values corresponding to the z initial estimated values with respect to $\Delta\theta(aP)$ based on the change value of the common phase noise, the log likelihood value of each joint state of the independent phase noise, and the error of the received signal, as shown in the following formula:

$$\overline{\Lambda}_z(aP) = \lambda_z - \frac{\Delta\hat{\theta}_z^2(aP)}{2\sigma_P^2} - \frac{\left|r\left((aP+P) - e^{j\left[\hat{\theta}(aP)+\Delta\tilde{\theta}_z(aP)\right]}\tilde{H}_z x(aP+P)\right)\right|^2}{\sigma_n^2}, \quad (9)$$

$$(1 \le z \le Z)$$

In the above formula, $|\cdot|^2$ represents the square sum of each element module. After that, the maximum log likelihood value is selected and denoted as $z'_{\alpha P} = \arg\max \overline{\Lambda}_z(\alpha P)$. Therefore, an estimated value of the common phase noise at the pilot position αP+P is obtained according to the following formula:

$$\hat{\theta}(aP+P) = \hat{\theta}(aP) + \Delta\tilde{\theta}_{z_{aP'}}(aP) \quad (10)$$

Herein, an estimate (corresponding to a=−1) of the common phase noise of the initial pilot with k=0 can be considered as $\hat{\theta}(0) = \Delta\tilde{\theta}_{z_{aP'}}(0)$.

After the estimated value of the common phase noise at the pilot position is obtained, the corresponding value at the effective data can be obtained through interpolation. For example, a linear interpolation process can be expressed as follows:

$$\hat{\theta}(\alpha P + p) = \frac{P-p}{P}\hat{\theta}(aP) + \frac{p}{P}\hat{\theta}(aP+P), (1 \le p \le P-1) \quad (1)$$

In the above formula, αP+p represents the $p^{th}$ interpolation point between αP and αP+P.

Through interpolation, the common phase noise at time point k can be obtained, and then the common phase noise can be suppressed through phase reversal, as shown in formula (12):

$$r'(k) = e^{-j\hat{\theta}(k)}r(k) \quad (12)$$

In the above formula, r'(k) represents a result obtained after the common phase noise is suppressed, and $\hat{\theta}(k)$ represents an estimated value of the common phase noise at time point k.

Step 3: For each joint phase state of the independent phase noise, signal demodulation is performed, and a posterior log likelihood value is calculated; and the joint phase state with the maximum posterior log likelihood value is taken as an estimation result of the independent phase noise of the plurality of channels, and the corresponding demodulation result is taken as the final output.

After the common phase noise is compensated, according to the following formula, a decorrelation result can be obtained based on the multi-channel decorrelation coefficient matrix $W_z$ corresponding to each joint state of the independent phase noise:

$$y_z(k) = W_z r'(k), (1 \le z \le Z, k \ne \alpha P) \quad (13)$$

In the above formula, $y_z(k)$ represents a decorrelation result corresponding to the $z^{th}$ joint state $\Psi_z$. Then, decision demodulation is performed on $y_z(k)$ to obtain $\tilde{X}_z(k)$.

For the demodulation result $\tilde{X}_z(k)$ corresponding to each joint state ($(1 \le z \le Z, k \ne \alpha P)$), a posterior log likelihood value is calculated according to the following formula:

$$\Lambda_z(k) = \lambda_z - \frac{\left|r'(k) - \tilde{H}_z \tilde{x}_z(k)\right|^2}{\sigma_n^2}, (1 \le z \le Z, k \ne aP) \quad (14)$$

After that, the maximum posterior log likelihood value is selected and denoted as $$z'_k = \arg\max_z \Lambda_z(k).$$

Therefore, the estimated value of the independent phase noise at time point k is $\Psi_{z_k'}$, and the demodulation output is $\hat{X}_z(k) = \tilde{X}_{z_k'}(k)$.

The present disclosure divides the phase noise of each channel in the MIMO system into the common phase noise and the independent phase noise for processing. Compared with the existing methods for the case in which independent local oscillators are used or the case in which a local oscillator is shared, the present disclosure is more suitable for the actual co-reference architecture, and can ensure better phase noise suppression performance, thereby providing support for improving the transmission capacity through spatial multiplexing.

To further explain a beneficial effect of the present disclosure compared with the prior art, a performance simulation example is provided herein. The number of transmitting antennas and the number of receiving antennas are the same, namely, $N_t = N_r = 2$ the communication frequency is set to 15 GHz, the transmission distance is 1.6 Km, and the spacings between two antennas at receiver and transmitter are both 3 m (equal to 0.75 times of the optimal antenna spacing), the normalized channel response matrix is shown in the following formula (15), a preceding matrix is obtained through singular value decomposition, and the result is shown in the following formula (16). After singular value decomposition, the demodulation performance of each channel in the MIMO system is different. Herein, the modulation modes of two channels are configured as 64 QAM and 16 QAM respectively. A Wiener model is set for the common phase noise at transmitter and receiver, where the power spectral density is −90 dBc/Hz at 100 kHz from the central frequency, the white Gaussian noise mode is set for the independent phase noise, and the standard deviation is 2 degree. The number of quantized states of each element of the independent phase noise is $Z_m = 4$ (m=1,2,3,4), the value of each state can be obtained based on Table 1, and the corresponding number of joint states is 256. In addition, the pilot spacing is set to 32.

$$H = \begin{bmatrix} 0.7071 & 0.4486 + 0.5466i \\ 0.4486 + 0.5466i & 0.7071 \end{bmatrix} \quad (15)$$

-continued $$P = \begin{bmatrix} -0.7071 & 0.7071 \\ -0.7071 & -0.7071 \end{bmatrix} \quad (16)$$

Figure 6:
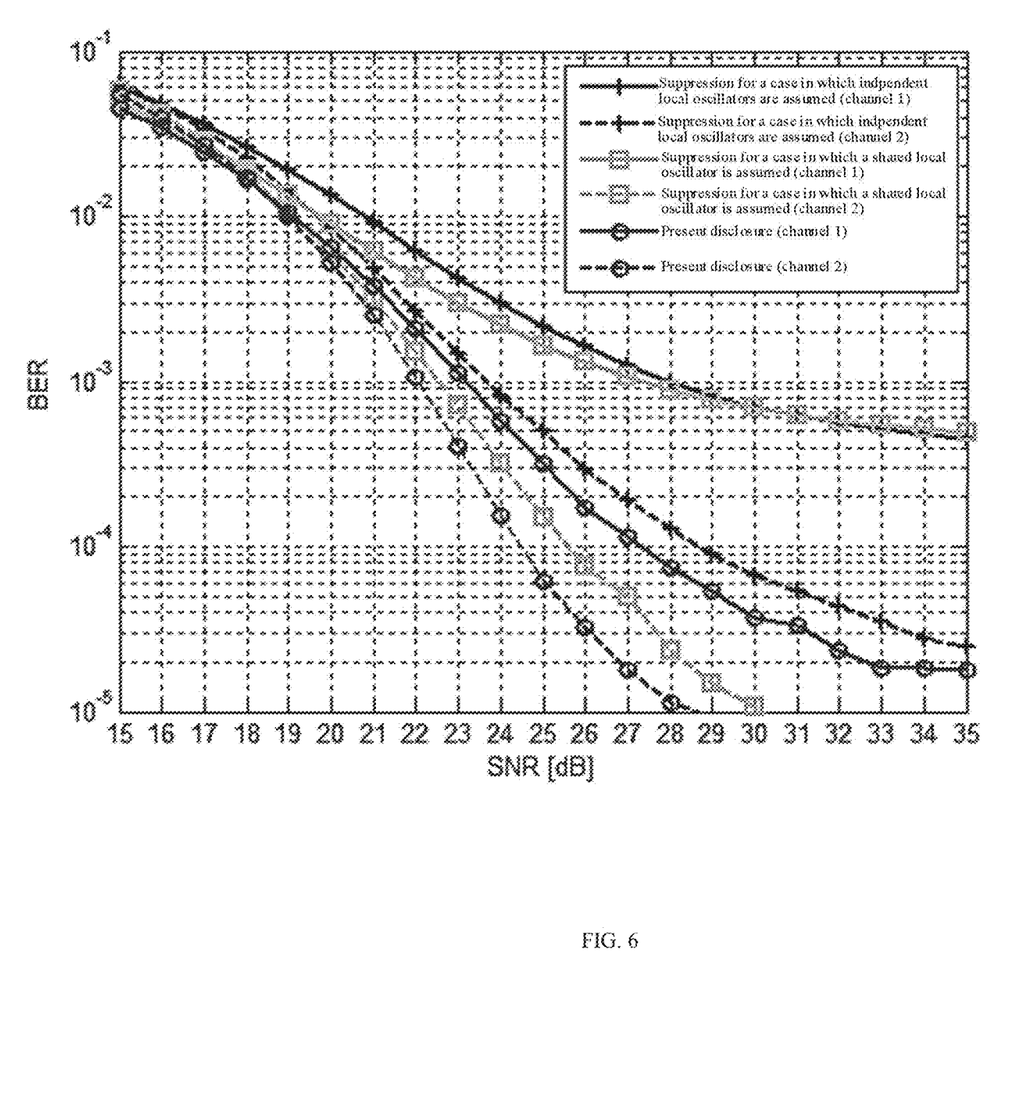
FIG. 6 compares BER performance in the technical solutions of the present disclosure and existing technical solutions.

FIG. 6 compares the BER performance of the two channels in the phase noise suppression method for the case in which independent local oscillators are assumed, the phase noise suppression method for the case in which a shared local oscillator is assumed, and the technical solutions in the present disclosure, where different SNRs are used, and no error correction code is considered. It can be seen from the figure that the technical solutions of the present disclosure significantly improve the BER performance of the two channels. A main problem of the phase noise suppression method for the case in which independent local oscillators are assumed is that internal characteristics of the co-reference architecture cannot be fully mined. The phase noise of each channel is considered as completely independent, while the phase noise suppression method for the case in which a shared local oscillator is assumed cannot process the independent phase noise. For channel 1, the BER performance in the phase noise suppression method for the case in which independent local oscillators are assumed and the phase noise suppression method for the case in which a shared local oscillator is assumed has a high error floor, which makes it difficult to ensure reliability. In contrast, the technical solutions of the present disclosure can reduce the error floor by more than 10 times and can ensure high reliability after adopting an error correction code. Channel 2 has a lower modulation order and has better BER performance than channel 1. However, the technical solutions of the present disclosure still have great advantages, and at BER=$10^{-4}$, the gains are about 4 dB and 1 dB respectively compared with the phase noise suppression method for the case in which independent local oscillators are assumed and the phase noise suppression method for the case in which a shared local oscillator is assumed.

The examples listed above are merely specific embodiments of the present disclosure. Apparently, the present disclosure is not limited to the above embodiments, and many variations are possible. All deformations that can be directly derived or associated by those skilled in the art from the present disclosure should be deemed as falling within the protection scope of the present disclosure.

What is claimed is:

1. A phase noise suppression method for a multiple-input multiple-output (MIMO) system with a plurality of co-reference channels, comprising the following steps:

S11: dividing phase noise of each channel in the MIMO system into common phase noise and independent phase noise, constructing a certain number of joint phase states for the independent phase noise, and calculating a log likelihood value and a multi-channel decorrelation coefficient matrix that correspond to each joint phase state, wherein step S11 comprises:

S111: dividing the phase noise of each channel in the MIMO system into the common phase noise and the independent phase noise, and establishing a signal model under impact of the phase noise in the MIMO system with the plurality of co-reference channels by considering a number of antennas at transmitter as $N_t$ and a number of antennas at receiver as $N_r$:

$r(k)=e^{j\theta(k)}[\Delta\Theta_r(k)H\Delta\Theta_t(k)Px(k)]+n(k)$ $\theta_{t,j}(k)=\theta_t(k)+\Delta\theta_{t,j}(k)(1 \leq j \leq N_t)$ $\theta_{r,i}(k)=\theta_r(k)+\Delta\theta_{r,i}(k)(1 \leq i \leq N_r)$ $\theta(k)=\theta_t(k)+\theta_r(k)$ wherein $\theta_{t,j}(k)$ represents phase noise of a $j^{th}$ channel at transmitter at time point k, and comprises common phase noise $\theta_t(k)$ and independent phase noise $\Delta\theta_{t,j}(k)$ of the $j^{th}$ channel; $\theta_{r,i}(k)$ represents phase noise of an $i^{th}$ channel at receiver at time point k, and comprises common phase noise $\theta_r(k)$ and independent phase noise $\Delta\theta_{r,i}(k)$ of the $i^{th}$ channel; $\theta(k)$ represents a sum of the common phase noise $\theta_t(k)$ at transmitter and the common phase noise $\theta_r(k)$ at receiver at time point k; x(k) represents a sent signal of each channel at transmitter at time point k, r(k) represents a received signal of each channel at receiver at time point k, and n(k) represents additive white Gaussian noise at time point k; P represents an $N_t \times N_t$ precoding matrix, satisfying $P^H P = I_{N_t \times N_t}$, wherein a superscript H represents that conjugate transposition is performed, and $I_{N_t \times N_t}$ represents an $N_t \times N_t$ identity matrix; H represents an $N_r \times N_t$ channel response matrix; and $\Delta\Theta_t(k)$ represents a diagonal matrix formed by an exponent $e^{j\Delta\theta_{t,j}(k)}$ of independent phase noise of each channel at transmitter at time point k, and $\Delta\Theta_r(k)$ represents a diagonal matrix formed by an exponent $e^{j\Delta\theta_{r,i}(k)}$ of independent phase noise of each channel at receiver at time point k;

S112: forming a vector $\Delta\theta(k)=[\Delta\theta_{t,1}(k) \Delta\theta_{t,2}(k) \ldots \Delta\theta_{t,N_t}(k) \Delta\theta_{r,1}(k) \Delta\theta_{r,2}(k) \ldots \Delta\theta_{r,N_r}(k)]^T = [\Delta\theta_1(k) \Delta\theta_2(k) \ldots \Delta\theta_{N_t+N_r}(k)]^T$ by the independent phase noise of each channel at transmitter and the independent phase noise of each channel at receiver, and quantizing each element $\Delta\theta_m(k)$ ($1 \leq m \leq N_t+N_r$) in the vector into $Z_m$ phase states that are denoted as a phase state $\varphi_m=[\varphi_{m,1} \varphi_{m,2} \ldots \varphi_{m,Z_m}]T$, wherein $\varphi_{m,1} < \varphi_{m,2} < \ldots < \varphi_{m,Z_m}$;

S113: selecting a state from each element based on the phase state of each element of the independent phase noise to form a joint state $\psi_z$ ($1 \leq z \leq Z$), wherein $$Z = \prod_{m=1}^{N_t+N_r} Z_m$$

represents a total number of joint states;

S114: calculating the log likelihood value corresponding to each joint state $\psi_z$ according to the following formula:

$$\lambda_z = \log f(\psi_z) = \sum_{m=1}^{N_t+N_r} \log f(\psi_{z,m}) = -\sum_{m=1}^{N_t+N_r} \frac{\psi_{z,m}^2}{2\sigma_m^2} + \upsilon$$

wherein $\upsilon$ represents a common coefficient, $\lambda_z$ represents the log likelihood value corresponding to $\psi_z$, f(•) represents a likelihood function, $\psi_{z,m}$ represents an $m^{th}$ element in the joint state $\psi_z$, and $\sigma_m^2$ represents a variance; and S115: calculating the multi-channel decorrelation coefficient matrix corresponding to each joint state $\psi_z$ according to the following formula:

$W_z = (\tilde{H}_z^H \tilde{H}_z + \sigma_n^2 I_{N_t \times N_t})^{-1} \tilde{H}_z^H$ wherein $W_z$ represents the multi-channel decorrelation coefficient matrix corresponding to $\psi_z$, $\tilde{H}_z$ represents an equivalent response matrix corresponding to $\psi_z$, and $\sigma_n^2$ represents power of the additive white Gaussian noise;

S12: inserting a pilot sequence into the sent signal based on a preset cycle, estimating common phase noise based on the pilot sequence at receiver, obtaining common phase noise of effective data other than the pilot sequence through interpolation fitting, and performing compensation, wherein S12 comprises:

S121: inserting the pilot sequence into the sent signal based on the preset cycle, and establishing a signal model of common phase noise between adjacent pilots:

$$r(aP+P) = e^{j[\hat{\theta}(aP) + \Delta\theta(aP)]} \tilde{H}(aP+P) \times (aP+P) + n(aP+P)$$

$$\theta(aP+P) = \theta(aP) + \Delta\theta(aP)$$

wherein pilot density is 1/P, that is, the pilot sequence is corresponded when k=aP, and the effective data is corresponded at other time points, wherein a is an integer; r(aP+P) represents a received signal at pilot position aP+P, θ(aP) and θ(aP) represent common phase noise at pilot position aP and a corresponding estimated value respectively, and Δθ(aP) represents a change value of common phase noise at pilot position aP+P relative to common phase noise at pilot position aP; and x(aP+P) represents a known sent signal at the pilot position aP+P, n(aP+P) represents additive white Gaussian noise at pilot position aP+P, and $\tilde{H}(aP+P)$ represents an unknown equivalent response matrix;

S122: for each joint state of the independent phase noise, estimating a change value of the common phase noise between the adjacent pilots, and calculating a corresponding log likelihood value according to the following formula:

$$\Delta\hat{\theta}_z(aP) = -\Leftrightarrow [e^{j\hat{\theta}(aP)} r^H(aP+P) \tilde{H}_z x(aP+P)], (1 \leq z \leq Z)$$

wherein $\Delta\hat{\theta}_z(aP)$ represents an initial estimated value of the change value of a $z^{th}$ piece of common phase noise at pilot position aP+P relative to position aP, initial estimated values of change values of Z pieces of common phase noise are obtained in total, and Z represents the total number of joint states;

S123: obtaining log likelihood values corresponding to the Z initial estimated values with respect to Δθ(aP) based on the change value of the common phase noise, the log likelihood value of each joint state of the independent phase noise, and an error of the received signal:

$$\bar{\Lambda}_z(aP) = \lambda_z - \frac{\Delta\hat{\theta}_z^2(aP)}{2\sigma_P^2} - \frac{\left| r(aP+P) - e^{j[\hat{\theta}(aP) + \Delta\hat{\theta}_z(aP)]} \tilde{H}_z x(aP+P) \right|^2}{\sigma_n^2},$$

$$(1 \leq z \leq Z)$$

wherein $|\cdot|^2$ represents a square sum of each element module, $\sigma_P^2$ represents a variance of Δθ(aP), $\tilde{H}_z$ represents the equivalent response matrix corresponding to $\psi_z$, $\sigma_n^2$ represents the power of the additive white Gaussian noise, $\lambda_z$ represents the log likelihood value corresponding to each joint phase state, and $\bar{\Lambda}_z(aP)$ represents the log likelihood value corresponding to the $z^{th}$ initial estimated value $\Delta\hat{\theta}_z(aP)$ with respect to Δθ(aP);

comparing the Z log likelihood values, selecting a maximum log likelihood value denoted as $$z'_{aP} = \arg\max_z \bar{\Lambda}_z(aP),$$

and then obtaining a final estimated value of the common phase noise at pilot position aP+P according to the following formula:

$$\hat{\theta}(aP+P) = \hat{\theta}(aP) + \Delta\hat{\theta}_{z_{aP}'}(aP)$$

obtaining the common phase noise of the effective data through interpolation; and S124: suppressing the common phase noise through phase reversal:

$$r'(k) = e^{-j\hat{\theta}(k)} r(k)$$

wherein $\hat{\theta}(k)$ represents an estimated value of the common phase noise at time point k after interpolation, r(k) represents the received signal of each channel at receiver at time point k before suppression, and r'(k) represents a result obtained after the common phase noise is suppressed; and S13: for each joint phase state of the independent phase noise, based on the multi-channel decorrelation coefficient matrix, performing signal demodulation on a result obtained after compensating for the common phase noise in S12, and calculating a posterior log likelihood value; and taking a joint phase state with a maximum posterior log likelihood value as estimation result of the independent phase noise of the plurality of co-reference channels, and taking the corresponding demodulation result as a final output; wherein step S13 comprises:

S131: calculating, according to the following formula, a decorrelation result based on the multi-channel decorrelation coefficient matrix $W_z$ corresponding to each joint state of the independent phase noise and the result r'(k) obtained after the common phase noise is suppressed:

$$y_z(k) = W_z r'(k), (1 \leq z \leq Z)$$

wherein $y_z(k)$ represents a decorrelation result corresponding to a $z^{th}$ joint state;

S132: performing decision demodulation on the decorrelation result to obtain the demodulation result $\tilde{x}_z(k)$, wherein $1 \leq z \leq Z$;

S133: for the demodulation result $\tilde{x}_z(k)$ corresponding to each joint state, calculating the posterior log likelihood value according to the following formula $$\Lambda_z(k) = \lambda_z - \frac{\left| r'(k) - \tilde{H}_z \tilde{x}_z(k) \right|^2}{\sigma_n^2}$$

wherein $\lambda_z$ represents the log likelihood value corresponding to each joint phase state, $\tilde{H}_z$ represents the equivalent response matrix corresponding to $\psi_z$, $\sigma_n^2$ represents the power of the additive white Gaussian noise, and $\Lambda_z(k)$ represents the posterior log likelihood value corresponding to each joint phase state; and S134: selecting the maximum posterior log likelihood value denoted as $$z'_k = \underset{z}{\mathrm{argmax}}\, \Lambda_z(k),$$

and then obtaining the estimated value $\psi_{z'_k}$ of the independent phase noise at time point k, and a final demodulation output structure $\hat{x}(k)=\hat{x}_{z'_k}(k)$.

2. The phase noise suppression method for the MIMO system with the plurality of co-reference channels according to claim 1, wherein a quantization criterion in step S112 is as follows:

$$\min_{\varphi_m} \int_{-\infty}^{+\infty} \min_{z(1\le z\le Z_m)} (x-\varphi_{m,z})^2 f_m(x)dx =$$

$$\min_{\varphi_m} \sum_{z=1}^{Z_m} \int_{\frac{\varphi_{m,z-1}+\varphi_{m,z}}{2}}^{\frac{\varphi_{m,z}+\varphi_{m,z+1}}{2}} (x-\varphi_{m,z})^2 f_m(x)dx$$

wherein $\varphi_{m,0}=-\infty$, $\varphi_{m,z_m+1}=+\infty$, and $f_m(x)$ represents a distribution function of an element $\Delta\theta_m(k)$; a minimization objective in the quantization criterion is a piecewise integral function, and solving is performed through offline search based on the given variance $\sigma_m^2$ to obtain a value of each discrete phase state $\varphi_{m,z}$ ($1\le z\le Z_m$).

3. The phase noise suppression method for the MIMO system with the plurality of co-reference channels according to claim 1, wherein an interpolation formula in step S123 is as follows:

$$\hat{\theta}(\alpha P + p) = \frac{P-p}{P}\hat{\theta}(aP) + \frac{p}{P}\hat{\theta}(aP+P),\ (1\le p\le P-1)$$

wherein aP+p represents a $p^{th}$ interpolation point between aP and aP+P, and $\hat{\theta}(aP+p)$ represents an interpolation result.

\* \* \* \* \*